United States Patent
Yoshii et al.

(10) Patent No.: US 7,093,197 B2
(45) Date of Patent: Aug. 15, 2006

(54) METHOD, APPARATUS, AND PROGRAM FOR PROCESSING SIGNATURE, AND STORAGE MEDIUM THEREFOR

(75) Inventors: Hiroto Yoshii, Tokyo (JP); Hatsuo Machida, Kanagawa (JP); Masaru Okazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 09/873,342

(22) Filed: Jun. 5, 2001

(65) Prior Publication Data

US 2001/0054968 A1 Dec. 27, 2001

(30) Foreign Application Priority Data

Jun. 23, 2000 (JP) .............................. 2000-189340

(51) Int. Cl.
*G06F 15/00* (2006.01)
*G06K 9/00* (2006.01)

(52) U.S. Cl. ................. 715/541; 715/526; 382/181; 382/187

(58) Field of Classification Search ........... 715/526, 715/528, 534, 541; 382/181, 187; 713/176
See application file for complete search history.

(56) References Cited

U.S. PATENT DOCUMENTS

| | | | | |
|---|---|---|---|---|
| 5,285,506 A | * | 2/1994 | Crooks et al. | 382/189 |
| 5,544,255 A | * | 8/1996 | Smithies et al. | 382/119 |
| 5,581,682 A | * | 12/1996 | Anderson et al. | 715/530 |
| 5,650,943 A | * | 7/1997 | Powell et al. | 702/51 |
| 5,909,500 A | * | 6/1999 | Moore | 382/123 |
| 6,061,793 A | * | 5/2000 | Tewfik et al. | 713/176 |
| 6,101,280 A | * | 8/2000 | Reynolds | 382/241 |
| 6,148,093 A | * | 11/2000 | McConnell et al. | 382/119 |
| 6,160,914 A | * | 12/2000 | Muroya | 382/187 |
| 6,209,102 B1 | * | 3/2001 | Hoover | 713/200 |
| 6,307,955 B1 | * | 10/2001 | Zank et al. | 382/121 |
| 6,430,308 B1 | * | 8/2002 | Ogawa et al. | 382/119 |
| 6,757,826 B1 | * | 6/2004 | Paltenghe | 713/170 |

FOREIGN PATENT DOCUMENTS

| | | |
|---|---|---|
| EP | 0 848 345 A2 | 6/1998 |
| JP | 10-143668 | 5/1998 |
| JP | 10-171926 | 6/1998 |

* cited by examiner

*Primary Examiner*—William Bashore
*Assistant Examiner*—Chau Nguyen
(74) *Attorney, Agent, or Firm*—Fitzpatrick, Cella, Harper & Scinto (57) ABSTRACT

A signature processing method determines, when displaying an input signature on a display unit, whether a predetermined condition is satisfied. When it is determined that the predetermined condition is satisfied, the signature on the display unit is displayed in a manner that it is difficult for others to discern the signature.

22 Claims, 8 Drawing Sheets

METHOD, APPARATUS, AND PROGRAM FOR PROCESSING SIGNATURE, AND STORAGE MEDIUM THEREFOR

BACKGROUND OF THE INVENTION

1. Field of the Invention

The present invention relates to methods, apparatuses, and programs for processing an input handwritten signature in order to determine whether or not the signature is written by an authentic user, and to storage media therefor.

2. Description of the Related Art

In general, a conventional user authentication method is performed using a user ID and a password. However, users tend to forget their passwords. In such cases, it is necessary to obtain the password based on the user ID in one way or another, and a security hole results. In order not to forget his/her password, the user often uses a word which is easy to remember, e.g., the user's birthday or the name of the user's child, as the password. The use of an easy-to-remember word as the password, itself is a security hole.

In order to prevent these problems, as described in "Method and Apparatus for Authenticating a Handwritten Character String" disclosed in Japanese Patent Laid-Open No. 10-143668 and in Japanese Patent Laid-Open No. 10-171926, a user authentication method (signature authentication method) is proposed in which handwritten data (signature data) is used in place of a password.

Unlike a password, handwritten data includes the characteristics of a person even when another person inputs the same word. As a result, a person other than the authorized user will fail in user authentication. Such characteristics include the shape of the characters, the stroke order of the characters, writing speed, writing rhythm, and the like.

Unlike fingerprints, the degree of freedom in registration contents is high. By registering a word such as a spell, it becomes more difficult for a person other than the user to pose as a registered user. By registering invariable signature data, the user who has registered the signature data can easily be authenticated.

In conventional authentication methods using passwords, it is possible to hide the input password using a symbol such as "*" in order to hide the password from another person who may be able to see the screen. However, in conventional authentication methods using signatures, signature data input by a user is displayed without any alteration while it is being input, and hence, another person can easily discern the input signature. In order to prevent this problem, handwritten information can be hidden from the user while it is being input. If this is done, however, it becomes difficult for the user to input the same signature data repeatedly.

In authentication methods using passwords, when a user forgets a password, a hint such as "the name of your pet" is given to the user in order to enable the user to recall the password. However, in conventional authentication methods using signatures, it is very difficult to express the shape of a user's signature in a sentence. When the user forgets the registered signature, it is impossible to assist the user in recalling his/her signature.

SUMMARY OF THE INVENTION

Accordingly, it is an object of the present invention to determine, when an input signature is being displayed on a display unit, whether a predetermined condition is satisfied, and when it is determined that the predetermined condition is satisfied, to display the signature on the display unit in a manner that it is difficult for others to discern the signature.

Preferably, the predetermined condition includes the existence of an instruction by a user to display the signature in a manner that it is difficult to discern the signature.

Preferably, the predetermined condition includes the failure of the user to remember his/her registered signature.

Preferably, when it is determined that the predetermined condition is satisfied, a combination of the color of a display region of the display unit for displaying the signature and the color of the signature, which makes it difficult to discern the signature, is used.

Preferably, when it is determined that the predetermined condition is satisfied, an image pattern is displayed on the display region of the display unit for displaying the signature.

Preferably, when it is determined that the predetermined condition is satisfied, the input signature is displayed in broken lines.

Preferably, when it is determined that the predetermined condition is satisfied, a portion of the input signature is displayed.

Preferably, the portion of the input signature is a portion input within a predetermined time before the current input time.

Preferably, when it is determined that the predetermined condition is satisfied, the input signature is displayed in a flashing manner.

Preferably, the signature includes coordinate data which is input using a coordinate input unit.

Further objects, features, and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DESCRIPTION OF THE PREFERRED EMBODIMENTS

Figure 11:
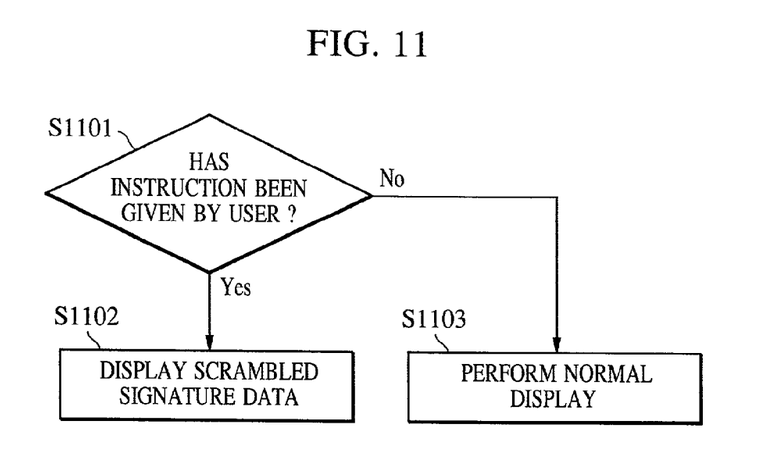
FIG. 11 is a flowchart showing a process of scrambling and displaying the signature.
Figure 12:
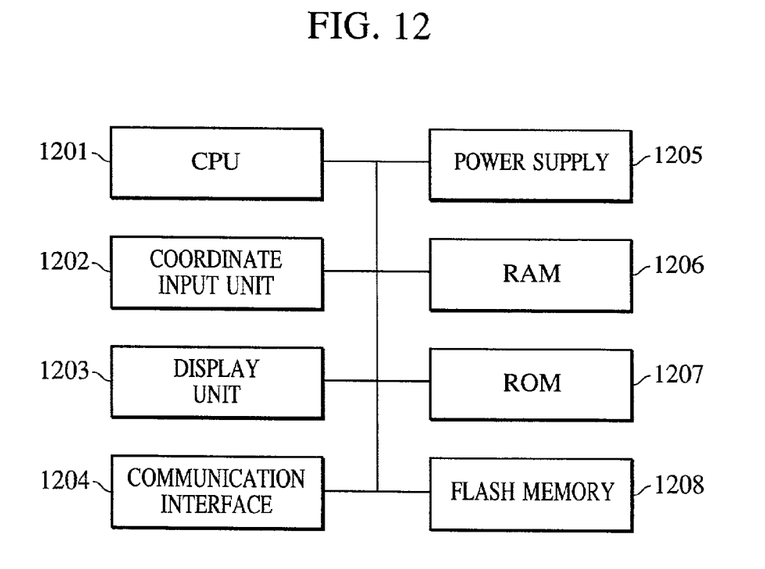
FIG. 12 is a block diagram of the internal structure of the signature authentication apparatus.

FIG. 12 is a block diagram of the internal structure of a signature authentication apparatus according to an embodiment of the present invention. Referring to FIG. 12, a central processing unit (CPU) 1201 reads a program such as a signature processing program for performing processes shown in FIGS. 1, 8, 10, and 11 or application software from a read only memory (ROM) 1207 or a flash memory 1208 for storing the program. The CPU 1201 uses a work area, i.e., a random access memory (RAM) 1206, and executes the program. A coordinate input unit 1202 is a digitizer. The coordinate input unit 1202 obtains a signature written by a user as handwritten data and outputs the handwritten data to the CPU 1201. A display unit 1203 displays information such as the input signature. A communication interface 1204 is used to establish a connection with a network for communication with an external unit. A power supply 1205 supplies power to components in the signature authentication apparatus. The RAM 1206 is the work area used when the CPU 1201 executes the program. The ROM 1207 and the flash memory 1208 are storage media which store the programs, such as the signature processing program for performing the processes shown in FIGS. 1, 8, 10, and 11 and the application software, and various types of data such as referential signature data dictionary used in authenticating the signature. The programs may be stored beforehand in the storage media. Alternatively, the programs can be supplied from the outside through removable media or network (communication interface), with the CPU 1201 executing the programs. Although the ROM 1207 and the flash memory 1208 are used as the storage media in this embodiment, storage media such as a hard disk, a floppy disk, a CD-ROM, a DVD, and the like can be used.

Figure 1:
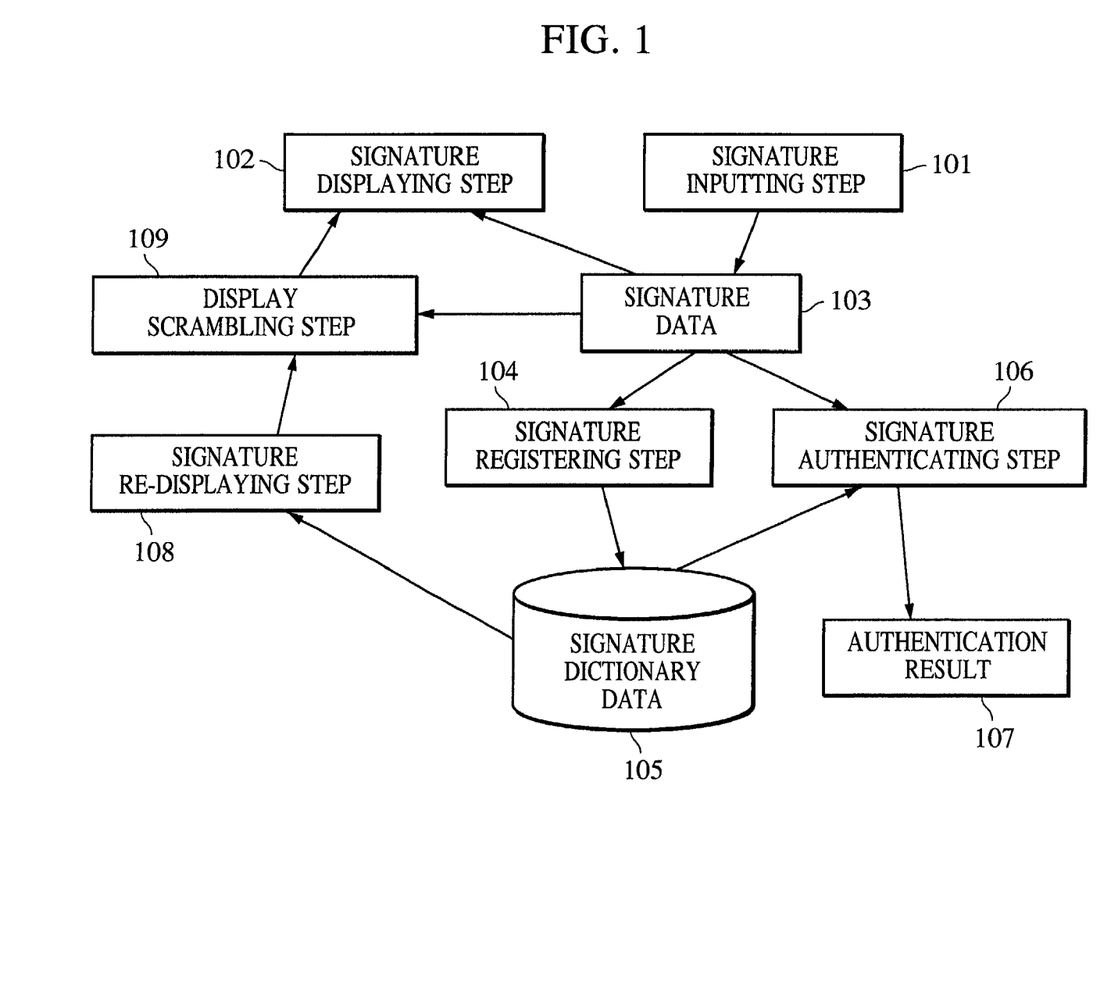
FIG. 1 illustrates the basic operation of a signature authentication apparatus according to an embodiment of the present invention.

FIG. 1 illustrates the basic operation of the signature authentication apparatus of the embodiment.

In a signature inputting step 101, coordinates are input by a so-called digitizer (coordinate input unit 1202). Specifically, a user uses a device such as a pen to input a signature on the digitizer, and the digitizer obtains a coordinate data series for the data input on the digitizer. Alternatively, a digitizer capable of further obtaining, during the signature inputting step 101, information such as the writing force and writing speed can be used.

In the normal operation, signature data 103 input in the signature inputting step 101 is output and displayed on the display unit 1203, which is, for example, a liquid crystal display, in a signature displaying step 102.

The digitizer used in the signature inputting step 101 can be combined with the display unit 1203 in which the digitizer is connected to a desktop computer. Also, the digitizer and the display unit 1203 may not be combined with each other. Preferably, when the digitizer and the display 1203 are combined, as in a liquid crystal tablet integrated-type apparatus, the user can directly input the signature as if the user is writing characters with a pen on paper.

Referential signature dictionary data can be registered by converting the input signature data 103 into signature dictionary data 105 in a signature registering step 104, and the signature dictionary data 105 can be stored in a dictionary.

When authenticating the signature, in a signature authenticating step 106, the signature data 103 input in order to authenticate the signature is matched with the signature dictionary data 105 registered in the dictionary, and an authentication result 107 indicating whether or not the authentication was successful is output.

In a signature re-displaying step 108, if the user forgets the signature, the signature dictionary data 105 registered in the dictionary is displayed in response to an instruction from the user. The registered signature dictionary data 105 is scrambled in a display scrambling step 109 so that another person will have difficulty in discerning the signature, and the signature is displayed in the signature displaying step 102.

In normal signature registration or normal signature authentication, in response to a special instruction given by the user, the input signature data 103 is scrambled in the display scrambling step 109 and is displayed in the signature displaying step 102, instead of being directly displayed in the signature displaying step 102.

Figure 2:
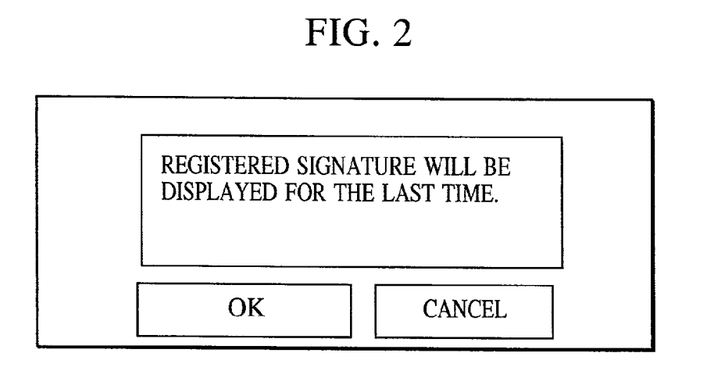
FIG. 2 illustrates a dialog box which asks a user whether or not to re-display a registered signature.

FIG. 2 illustrates a dialog box which is displayed when activating the signature re-displaying step 108. Since the signature re-displaying step 108 is a very unsecure step in the authentication system, for example, the number of times the signature is re-displayed is recorded, and the signature can be re-displayed up to three times.

Figure 3:
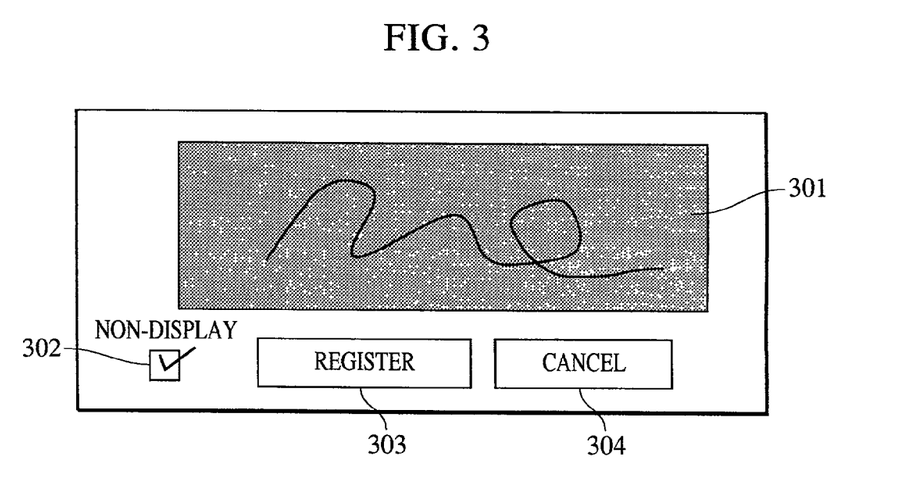
FIG. 3 illustrates an example of a display screen when a signature is registered.

FIG. 3 illustrates the screen which is displayed when the signature registering step 104 is performed. A non-display check box 302 enables the user to choose whether or not he/she wants to use the display scrambling step 109. When the non-display check box 302 is not selected, the input signature data 103 is clearly displayed with the signature data 103 in black on a white background of a signature display portion 301 (black and white are, of course, merely examples). When the non-display check box 302 is selected, as shown in FIG. 3, the signature data 103 is scrambled in the display scrambling step 109 prior to being displayed on the signature display portion 301. For example, the color of the background is changed, and hence, the input signature data 103 is displayed in a manner that it is difficult to discern the signature.

FIG. 11 is a flowchart showing a process of switching between performing and not performing the display scrambling step 109 in response to an instruction given by the user, such as by selecting the non-display check box 302. In step S1101, the process determines whether an instruction to perform the display scrambling step 109 is given by the user. For example, if the non-display check box 302 is selected, and hence, if it is determined that the instruction to perform the display scrambling step 109 is given by the user, in step S1102, the process switches the display screen so that it becomes difficult for others to discern an input signature. When no instruction is given by the user to perform the display scrambling step 109, the signature is displayed clearly.

FIGS. 4 to 10 illustrate examples where the display scrambling step 109 is used when displaying a signature.

Figure 4:
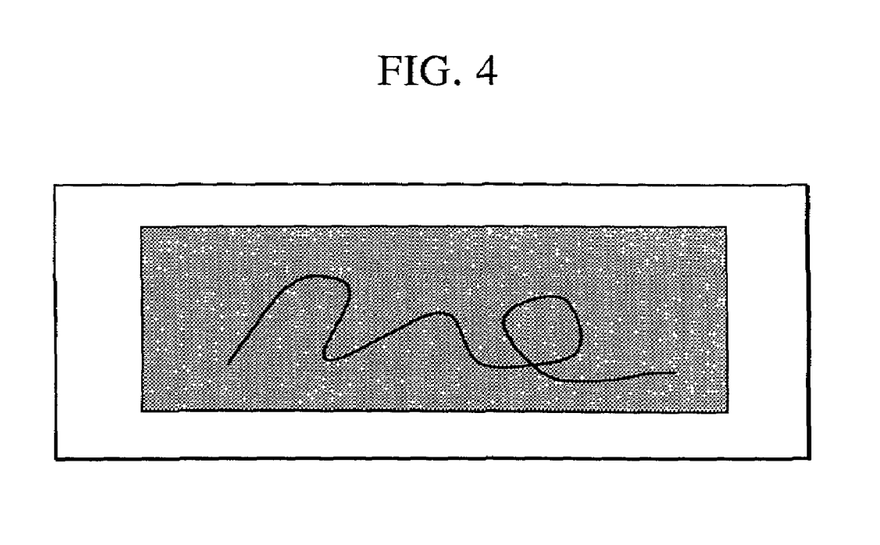
FIG. 4 illustrates a case in which the color a background increases the difficulty in determining the signature.

FIG. 4 shows an example in which the signature data 103 and the background are displayed using similar colors of similar brightness. For example, the background and the signature portion are displayed in different colors with the same brightness. Alternatively, the background can be gray, and the signature data 103 can be white. Also, a combination of similar colors can be used. As a result, it becomes difficult to discern the signature.

Figure 5:
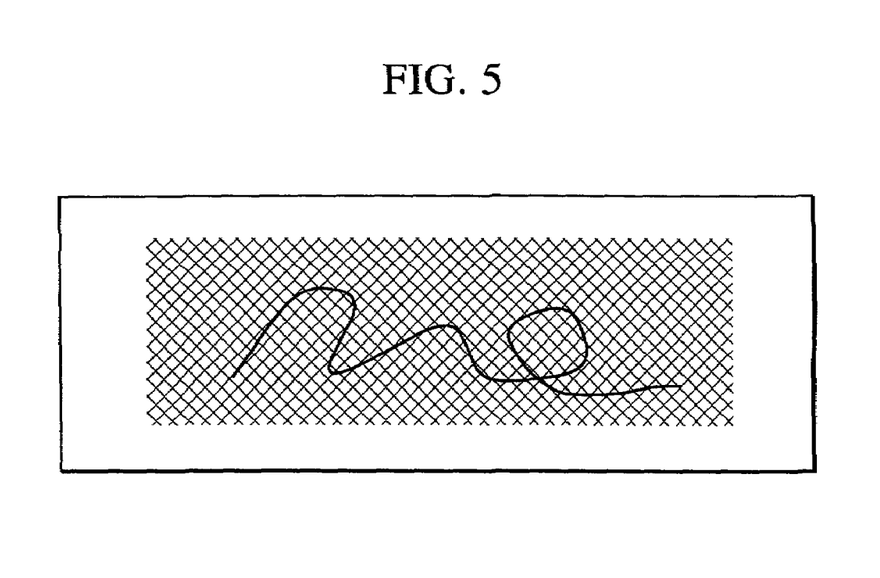
FIG. 5 illustrates a case in which the signature is displayed on a hatched background.

FIG. 5 shows an example in which a special pattern is displayed on the background. For example, as shown in FIG. 5, a hatched pattern is displayed on the background, and hence it becomes difficult to discern the signature data 103.

The special pattern is not necessarily a hatched pattern. Any image pattern can be used as long as the signature is difficult to discern.

Figure 6:
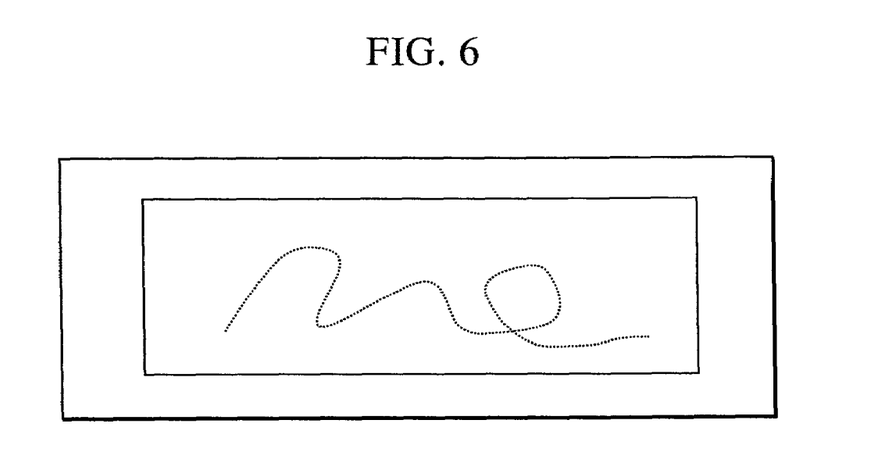
FIG. 6 illustrates a case in which the signature is partially displayed using dotted lines.

FIG. 6 shows an example in which the signature data 103 is partially displayed. For example, the signature data 103 is displayed in dotted lines instead of solid lines. Alternatively, only portions near the beginning point and the end point of a stroke can be displayed, thereby making it difficult to discern the signature data 103.

Figure 7:
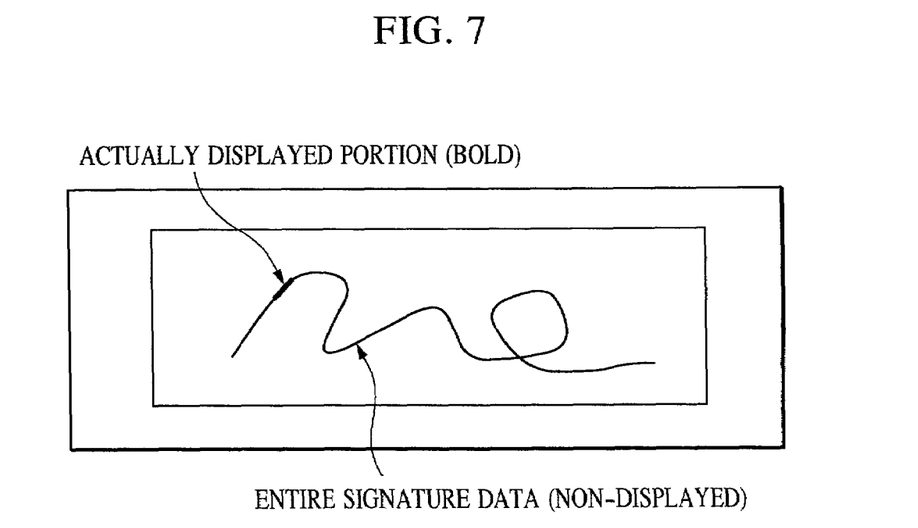
FIG. 7 illustrates a case in which the signature is displayed and deleted immediately thereafter.

FIG. 7 shows an example in which a displayed signature is successively deleted immediately after the signature data 103 is displayed. For example, it is assumed that the coordinates of the input signature data 103 are displayed for a period of 0.1 second. If the entire signature data 103 is written in 2 seconds, approximately 1/20th of the entirety is displayed at any given time. The signature data 103 can be obtained not only as shape information but also as information indicating writing timing and time interval. Dynamic display of the signature data 103 is very important in assisting the user to remember his/her signature. Referring to FIG. 7, the signature is displayed as it is input. In addition, the signature is deleted a very short period of time after it is input. As a result, it becomes difficult to discern the signature.

Figure 8:
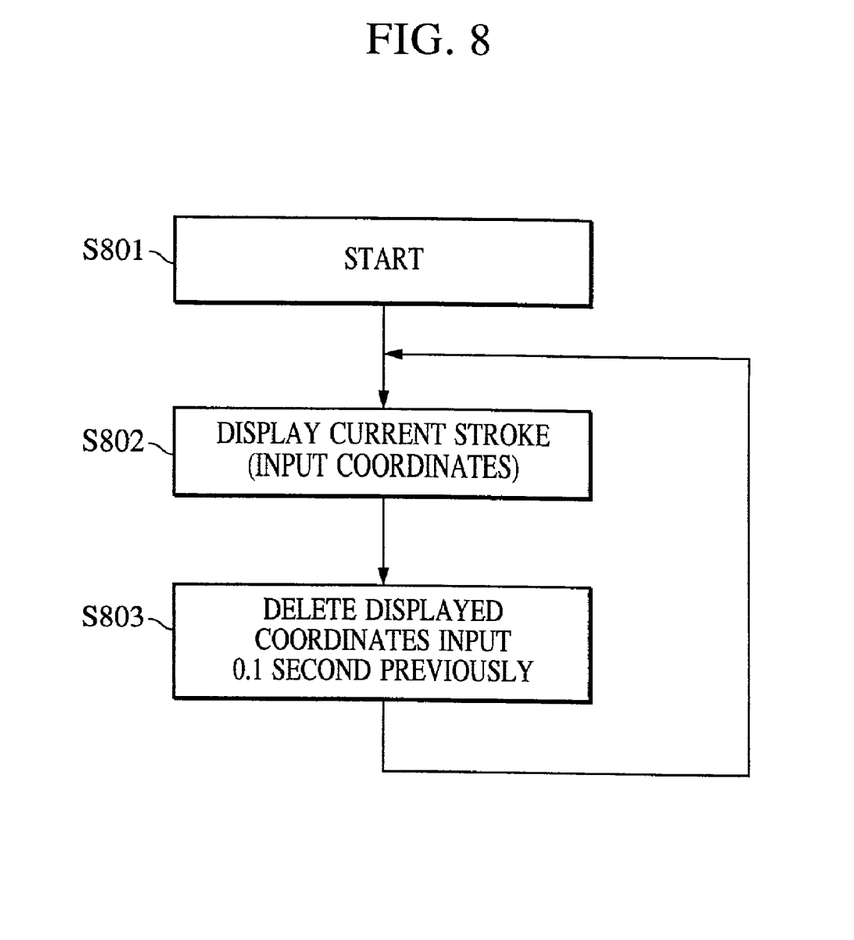
FIG. 8 is a flowchart showing a process of displaying the signature as illustrated in FIG. 7.

FIG. 8 is a flowchart showing a scrambling process illustrated in FIG. 7. The inputting of a signature starts in step S801. In step S802, the process displays the currently-input coordinates (signature data 103) of a currently-input stroke. In step S803, the process deletes displayed coordinate data (signature data 103) which is input a predetermined period of time previously, e.g., 0.1 second previously. The deletion is performed by re-rendering the stroke which had been input a short time previously in the current display loop using rendering XOR.

Alternatively, only one stroke (part of the entire signature) which is currently being input may be displayed.

Figure 9:
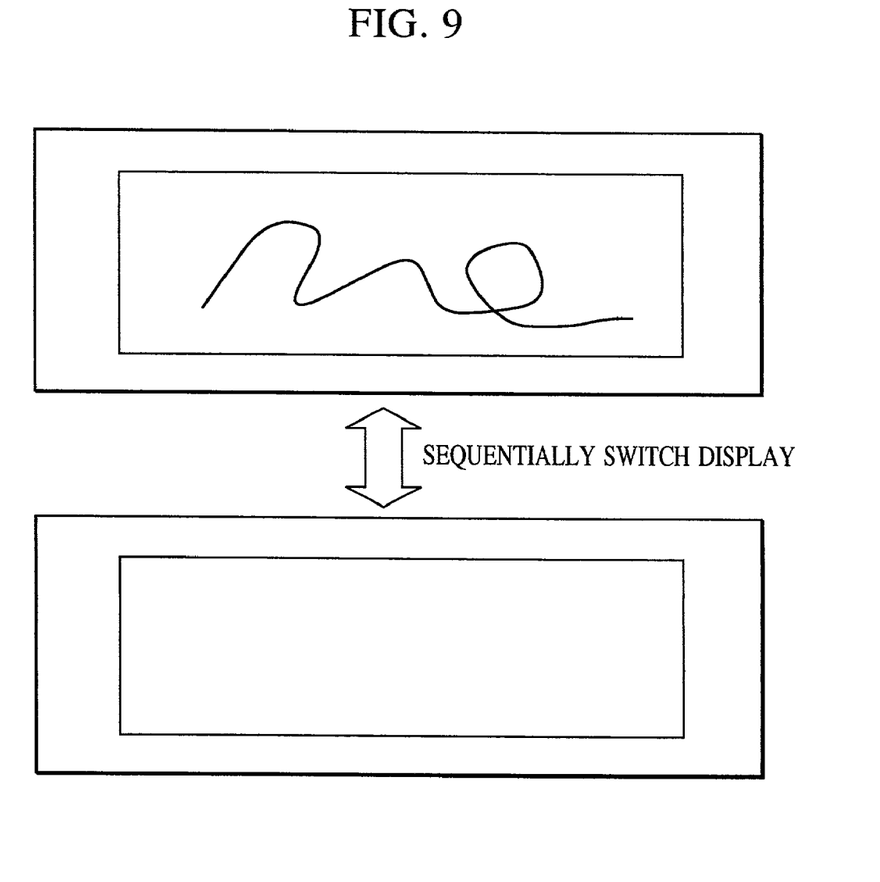
FIG. 9 illustrates a case in which the signature is displayed in a flashing manner.

FIG. 9 shows an example in which the signature data 103 is flashed when it is being displayed. When the signature is input, the state in which the signature is displayed and the state in which the signature is deleted are switched every predetermined period of time. As a result, it becomes difficult to discern the signature data 103.

Figure 10:
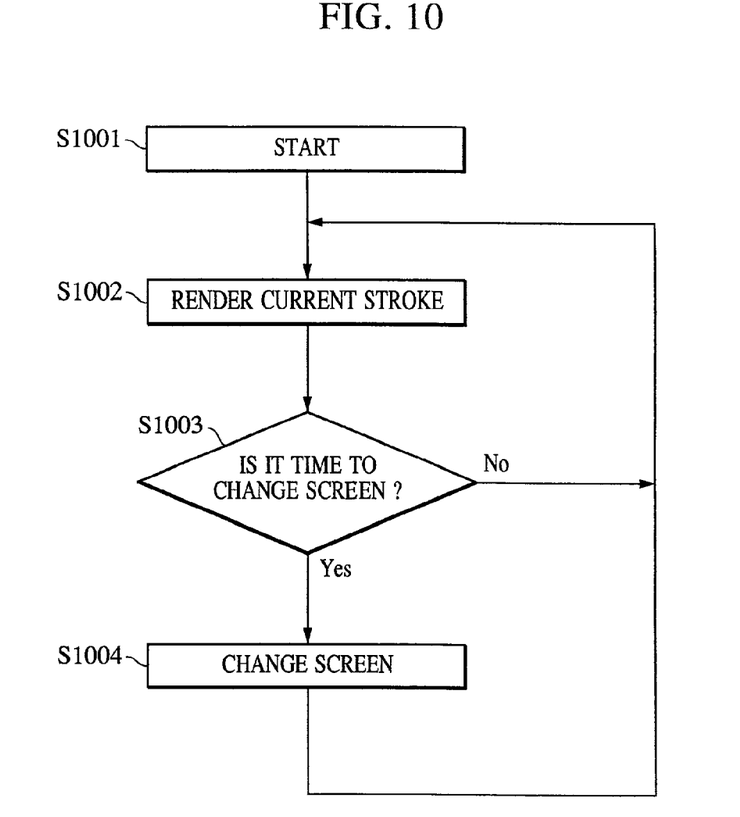
FIG. 10 is a flowchart showing a process of displaying the signature as illustrated in FIG. 9.

FIG. 10 is a flowchart showing the scrambling process illustrated in FIG. 9. For example, two logical graphics screens are retained. On one logical screen (first logical screen), a stroke (input coordinates) is rendered. On the other screen (second logical screen), white is displayed.

In the rendering loop, only one of the logical screens is displayed. A timer measures a predetermined period of time, and when it is time to change the display, the currently-displayed logical screen is changed to the other logical display screen. The inputting of a signature starts in step S1001. In step S1002, the process renders coordinates which are input on the first logical screen. While the first logical screen is displayed, the signature being input is displayed. While the second logical screen is displayed, a white screen is displayed. In step S1003, the process determines whether it is time to change the displayed screen. If the determination is affirmative, the process changes the displayed logical screen in step S1004.

As described above, according to the embodiment of the present invention, it is possible to prevent others from discerning a signature being input by displaying the signature as in FIGS. 4 to 10.

A combination of the display scrambling methods performed in the display scrambling step 109, which are described with reference to FIGS. 4 to 10, can be used.

In this embodiment, as shown in FIG. 3, the displaying of the signature at the time the signature is registered is described. However, the display scrambling step 109 is not limited to this embodiment. The display scrambling step 109 can be applied to cases in which the signature is authenticated, re-registered, or re-displayed. As a result, it is possible to prevent others from discerning the signature.

According to this embodiment, handwritten data can be displayed so that it is difficult to be discerned by others while allowing the user who has written the data to recognize the data to a certain degree. Thus, the security of the authentication system is enhanced.

If a user forgets signature data registered by the user, display is performed to enable only the user to remember the forgotten signature data. As a result, the user can recall the registered signature to mind.

The implementation of all of the elements and steps described above is within the ordinary level of skill in the relevant technical field, using components and techniques that are commercially available and/or well known to those in the art.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signature processing method for displaying a signature on a display unit, comprising:

an inputting step of inputting a signature on the display unit, the signature being handwritten by a user via a digitizer, the signature being composed of at least one stroke; and a control step of displaying the inputted stroke of the signature and a background pattern on the display unit, wherein the background pattern is a pattern which makes it difficult for others to discern the stroke of the signature as the stroke is being inputted via the digitizer in said inputting step, while yet allowing the user to discern the stroke of the signature as the stroke is being inputted via the digitizer in said inputting step.

2. A signature processing method according to claim 1, further comprising a determining step, of determining whether an instruction is given by the user to display the stroke of the signature in a manner such that it is difficult for the others to discern the stroke of the signature and that makes it possible for the user to discern the stroke of the signature, wherein said control step is executed in response to a determination in said determining step that the instruction is given, and wherein said control step includes displaying, in a normal fashion, the stroke of the signature being inputted via the digitizer on the display unit when it is determined in said determining step that the instruction is not given.

3. A signature processing method according to claim 1, further comprising:

a registering step, of registering the signature inputted in said inputting step.

4. A signature processing method according to claim 1, wherein, in said control step, the stroke of the signature is displayed at the color similar to a color of the background pattern.

5. A signature processing method according to claim 1, wherein the background pattern displayed in said control step is a hatched pattern that makes it difficult for others to discern the stroke of the signature and that makes it possible for the user to discern the stroke of the signature.

6. A signature processing method according to claim 1, wherein portions near the beginning point and the end point of the stroke of the signature are displayed in said control step in a manner that makes it difficult for others to discern the stroke of the signature and that makes it possible for the user to discern the stroke of the signature.

7. A signature processing method according to claim 1, wherein the stroke of the signature comprises coordinate data which is input via the digitizer.

8. A signature processing apparatus for displaying a signature on a display unit, comprising:
    inputting means for inputting a signature on the display unit, the signature being handwritten by a user via digitizer, the signature being composed of at least one stroke; and
    control means for displaying inputted stroke of the signature and a background pattern on the display unit, wherein the background pattern is a pattern which makes it difficult for others to discern the stroke of the signature as the stroke is being inputted via the digitizer by said inputting means, while yet allowing the user to discern the stroke of the signature as the stroke is inputted via the digitizer by said inputting means.

9. A signature processing apparatus according to claim 8, further comprising determining means for determining whether an instruction is given by the user to display the stroke of the signature in a manner such that it is difficult for the others to discern the stroke of the signature and that makes it possible for the user to discern the stroke of the signature,
    wherein said control means operates in response to a determination by said determining means that the instruction is given,
    and wherein said control means displays, in a normal fashion, the stroke of the signature being inputted via the digitizer on the display unit when it is determined by said determining means that the instruction is not given.

10. A signature processing apparatus according to claim 8, further comprising:
    registering means for registering the signature inputted by said inputting means.

11. A signature processing apparatus according to claim 8, wherein said control means displays the stroke of the signature at the color similar to a color of the background pattern.

12. A signature processing apparatus according to claim 8, wherein the background pattern displayed by said control means is a hatched pattern that makes it difficult for others to discern the stroke of the signature and that makes it possible for the user to discern the stroke of the signature.

13. A signature processing apparatus according to claim 8, wherein said control means displays only a portion of the stroke of the signature in a manner that makes it difficult for others to discern the stroke of the signature and that makes it possible for the user to discern the stroke of the signature.

14. A signature processing apparatus according to claim 8, wherein the stroke of the signature comprises coordinate data which is input via the digitizer.

15. A signature processing program for displaying a signature on a display unit, comprising:
    an inputting step, of inputting a signature on the display unit, the signature being handwritten by a user via a digitizer, the signature being composed of at least one stroke; and
    a control step, of displaying the inputted stroke of the signature and a background pattern on the display unit, wherein the background pattern is a pattern which makes it difficult for others to discern the stroke of the signature as the stroke is being inputted via the digitizer in said inputting step, while yet allowing the user to discern the stroke of the signature as the stroke is being inputted via the digitizer in said inputting step.

16. A signature processing program according to claim 15, further comprising a determining step, of determining whether an instruction is given by the user to display the stroke of the signature in a manner such that is difficult for the others to discern the stroke of the signature and that makes it possible for the user to discern the stroke of the signature,
    wherein said control step is executed in response to a determination in said determining step that the instruction is given,
    and wherein said control step includes displaying, in a normal fashion, the stroke of the signature being inputted via the digitizer on the display unit when it is determined in said determining step that the instruction is not given.

17. A signature processing program according to claim 15, further comprising:
    a registering step, of registering the signature inputted in said inputting step.

18. A signature processing program according to claim 15, wherein, in said control step, the stroke of the signature is displayed at the color similar to a color of the background pattern.

19. A signature processing program according to claim 15, wherein the background pattern displayed in said control step is a hatched pattern that makes it difficult for others to discern the stroke of the signature and that makes it possible for the user to discern the stroke of the signature.

20. A signature program according to claim 15, wherein portions near the beginning point and the end point of the stroke of the signature are displayed in said control step in a manner that makes it difficult for others to discern the stroke of the signature and that makes it possible for the user to discern the stroke of the signature.

21. A signature processing program according to claim 15, wherein the stroke of the signature comprises coordinate data which is input via the digitizer.

22. A computer-readable storage medium storing a signature processing program, the program comprising:
    an inputting step, of inputting a signature on the display unit, the signature being handwritten by a user via a digitizer, the signature being composed of at least one stroke; and
    a control step, of displaying the inputted stroke of the signature and a background pattern on the display unit, wherein the background pattern is a pattern which makes it difficult for others to discern the stroke of the signature as the stroke is being inputted via the digitizer in said inputting step, while yet allowing the user to discern the stroke of the signature as the stroke is being inputted via the digitizer in said inputting step.

* * * * *